(12) United States Patent
Mueller

(10) Patent No.: US 7,675,673 B2
(45) Date of Patent: Mar. 9, 2010

(54) APPARATUS FOR PROVIDING MULTIPLE TIME-DIVISION MULTIPLEXED INDEPENDENTLY CONTROLLABLE PULSED BEAMS FROM A SINGLE, PULSED LASER OUTPUT-BEAM

(75) Inventor: Eric R. Mueller, West Suffield, CT (US)

(73) Assignee: Coherent, Inc., Santa Clara, CA (US)

( * ) Notice: Subject to any disclaimer, the term of this patent is extended or adjusted under 35 U.S.C. 154(b) by 163 days.

(21) Appl. No.: 12/055,943

(22) Filed: Mar. 26, 2008

(65) Prior Publication Data
US 2009/0244691 A1    Oct. 1, 2009

(51) Int. Cl.
G02F 1/33 (2006.01)

(52) U.S. Cl. .................. 359/309; 359/305; 359/306

(58) Field of Classification Search .......... 359/305, 359/306, 307, 238, 237, 298
See application file for complete search history.

(56) References Cited

U.S. PATENT DOCUMENTS

| | | | |
|---|---|---|---|
| 3,727,062 A | 4/1973 | Foster | 250/199 |
| 3,744,039 A | 7/1973 | Hrbek et al. | 340/173 LM |
| 3,935,566 A | 1/1976 | Snopko | 340/173 LM |
| 4,000,493 A | 12/1976 | Spaulding et al. | 346/1 |
| 4,321,564 A | 3/1982 | Tregay | 332/7.51 |
| 4,371,964 A | 2/1983 | Podmaniczky et al. | 372/38 |
| 5,302,798 A | 4/1994 | Inagawa et al. | |
| 5,430,816 A | 7/1995 | Furuya et al. | |
| 5,450,223 A | 9/1995 | Wagner et al. | 359/124 |
| 5,721,749 A | 2/1998 | Holleman et al. | |
| 5,949,932 A | 9/1999 | Lawrenz-Stolz | 385/33 |
| 6,031,852 A | 2/2000 | Thompson et al. | 372/20 |
| 6,931,195 B2 | 8/2005 | Lemoff | |
| 6,947,454 B2 | 9/2005 | Sun et al. | |
| 7,003,003 B2 | 2/2006 | Mueller et al. | 372/13 |
| 7,486,705 B2 * | 2/2009 | Shah et al. | 372/25 |
| 2002/0085085 A1 | 7/2002 | Fischer et al. | 347/239 |

FOREIGN PATENT DOCUMENTS

JP         54-128359         4/1979
WO    WO-2009/029164 A2    3/2009

OTHER PUBLICATIONS

D.C. Thompson et al., "High-speed random access laser tuning," *Applied Optics*, vol. 38, No. 12, Apr. 20, 1999, pp. 2545-2553.
D.C. Thompson et al., "Acousto-Optically Tuned Isotopic $CO_2$ Lasers for Long-Range Differential Absorption LIDAR," *Proceedings of the SPIE—The International Society for Optical Engineering*, vol. 3383, Apr. 1998, pp. 33-44.
U.S. Appl. No. 11/895,248, filed Aug. 23, 2007, by Raymond Michaud et al., entitled "Apparatus for Providing Multiple Independently Controllable Beams from a Single Laser Output Beam and Delivering the Multiple Beams Via Optical Fibers".

* cited by examiner

*Primary Examiner*—Timothy J Thompson
(74) *Attorney, Agent, or Firm*—Morrison & Foerster LLP

(57) ABSTRACT

An output beam from a laser is directed into an acousto-optic cell. The laser beam includes repeated sequences of two or more pulses. The acousto-optic cell is sequentially driven by RF voltages at two or more frequencies. A portion of the laser output beam is diffracted by the acousto-optic cell at two or more different angles to the laser output beam. This provides two or more secondary beams. One of the secondary beams includes only the first pulses of the sequences; the other includes only the second pulses of the sequences. The duration of the pulses in the laser beam is controlled to control time-averaged power in the secondary beams.

15 Claims, 4 Drawing Sheets

(Prior-Art)

APPARATUS FOR PROVIDING MULTIPLE TIME-DIVISION MULTIPLEXED INDEPENDENTLY CONTROLLABLE PULSED BEAMS FROM A SINGLE, PULSED LASER OUTPUT-BEAM

TECHNICAL FIELD OF THE INVENTION

The present invention relates generally to dividing a single laser output beam into a plurality of beams. The invention relates in particular to dividing an output beam from a $CO_2$ laser into a plurality of beams and directing the plurality of beams into a corresponding plurality of optical fibers.

DISCUSSION OF BACKGROUND ART

Laser applications often require a work piece to be irradiated with two or more individually controlled laser beams. Prior art methods of providing such a plurality of individually controlled laser beams have involved the use of arrays of beamsplitters including polarization-sensitive beamsplitters and polarization rotators. Using such beam splitter arrays together with separate modulators or controllers, while less costly than using a separate lasers for each required laser beam, may still prove prohibitively expensive, depending on a particular application.

Another method involves dividing a beam using an acousto-optic deflector powered at a number of different frequencies equal to the number of beams desired. This method is described in U.S. Pat. No. 7,003,003 assigned to the assignee of the present invention and the complete disclosure of which is hereby incorporated by reference. An abbreviated description of the method disclosed in the '003 patent is set forth below with reference to FIG. 1.

FIG. 1 schematically depicts beam-dividing apparatus 10 in which there are laser beam paths and connections between electronic and electrical components. Beam paths are depicted by fine lines, and electrical connections are depicted by bold lines. Apparatus 10 includes a carbon dioxide laser $CO_2$ laser 12 including an RF power supply (not shown). A $CO_2$ laser can provide an output beam having a wavelength between about 9 and 11 micrometers (μm). A controller 14 controls the output power of the laser and commands the RF power supply to operate the laser in a selected mode such as continuous wave (CW) or pulsed mode. Laser 10 delivers an output beam 16. Beam 16 is directed by turning mirrors 18 and 20 into an acousto-optic cell 22. One preferred acousto-optic cell is a model AGD-406 available from IntraAction Corporation of Bellwood, Ill. Such an AO-cell is generally referred to as a broadband AO-cell. Broadband AO-cells are designed to maintain the Bragg relationship (see below) over the entire bandwidth of the device. This allows the cell to be simultaneously driven at a plurality of different RF frequencies and provides minimal variation of the diffraction intensity, for example, less than about 10%, across a wide range of possible diffraction angles.

In apparatus 10, AO-cell 22 is driven by RF voltages at four different RF frequencies, $f_1$, $f_2$, $f_3$, and $f_4$, within the bandwidth of the AO-cell. Each driving frequency deflects a portion of output beam 16 at a particular angle depending on the frequency. The power in each diffracted portion (diffracted beam or secondary beam) is dependent, inter alia, on the power in beam 16 and the magnitude of the driving frequency, i.e., the magnitude of the RF voltage at that driving frequency.

The diffraction angle (the Bragg angle) is given by the Bragg relationship:

$$\sin \theta_{Bn} = \lambda_0 f_n / 2 N_0 V_a \tag{1}$$

where $\theta_{Bn}$ is the Bragg angle for frequency $f_n$, $f_n$ is the driving frequency; $\lambda_0$ is the laser beam wavelength; $N_0$ is the refractive index of the acousto-optic cell material at wavelength $\lambda_0$; and $V_a$ is the acoustic velocity in the cell material. In this example, the diffracting material of the cell is germanium (Ge), which is transparent for output wavelengths of the $CO_2$ laser. Those skilled in the art will recognize that other laser wavelengths may require a cell having a different diffracting material.

Acoustic waves propagated in the acousto-optic material of the AO-cell by the driving frequencies generate optical phase gratings (not shown) within the acousto-optic material, through which laser output beam 16 passes. The angular (frequency) resolution of AO-cell depends, inter alia, on the size of beam 16 at the AO-cell and the driving frequencies. Beam-size is adjustable by a telescope or beam expander 24. Alternatively, the driving frequencies can be varied, to increase or decrease the spacing of the phase gratings.

In apparatus 10, driving frequencies for the acousto-optic cell are generated by four individual RF oscillators, designated $f_1$, $f_2$, $f_3$, and $f_4$ corresponding to the frequencies that are generated thereby. The RF voltage outputs of oscillators $f_1$, $f_2$, $f_3$, and $f_4$ are amplified by variable gain amplifiers $A_1$, $A_2$, $A_3$, and $A_4$, respectively. Driving AO-cell 22 with four frequencies provides four diffracted beams designated $B_1$, $B_2$, $B_3$, and $B_4$ corresponding to the driving frequencies. An undiffracted portion 16R of beam 16 is absorbed by a beam dump 26. The diffracted beams are directed by turning mirrors 27 and 28 into a folded optical path that is long enough to achieve a desired spatial separation of the beams. Once the beam separation is adequate, the beams can be focused by lenses 30 directly onto a workpiece. A beamsplitter 32 directs a sample of each beam to an individual detector to provide a measure of power in the beam. The samples are designated $S_1$, $S_2$, $S_3$, and $S_4$ corresponding to beams $B_1$, $B_2$, $B_3$, and $B_4$. Detectors are designated $D_1$, $D_2$, $D_3$, and $D_4$ corresponding to beams $B_1$, $B_2$, $B_3$, and $B_4$.

The detectors and associated circuitry 34 monitor power of each of the diffracted beams. The detector outputs are compared by a processor 36 against four input reference voltage signals provided by processor 36 in response to commands $C_1$, $C_2$, $C_3$, and $C_4$, corresponding to beams $B_1$, $B_2$, $B_3$, and $B_4$. The commands provided to the processor establish the desired amount of optical power in each of the beams. The reference voltage signals are representative of that desired power. Comparison of the reference voltages and the detector outputs provides gain commands $G_1$, $G_2$, $G_3$, and $G_4$ to amplifiers $A_1$, $A_2$, $A_3$, and $A_4$ respectively. The gain commands provide that the amplifiers increase or decrease the power of driving frequencies $f_1$, $f_2$, $f_3$, and $f_4$. There are, in effect, four control loops designated $L_1$, $L_2$, $L_3$, and $L_4$ corresponding to the four beams $B_1$, $B_2$, $B_3$, and $B_4$, respectively. The amplitude of each of the four beams $B_1$, $B_2$, $B_3$, and $B_4$ can be independently adjusted by varying the gain and accordingly the RF output voltage of amplifiers $A_1$, $A_2$, $A_3$ and $A_4$ respectively.

When the power of one of beams $B_1$, $B_2$, $B_3$, and $B_4$ is changed, absent any other action, power in the other beams will change because all of the beams share a common input (beam 16). This can be defined as a cross coupling between the beams. By way of example, if a voltage at one driving frequency is increased to diffract more light out laser beam 16 into a corresponding secondary beam, then power in the other three beams will be correspondingly reduced. An effect of this is that processor 36, particularly if control loops $L_1$, $L_2$, $L_3$, and $L_4$ all have about the same bandwidth, can attempt to restore power to the other beams, thereby causing power in one or more of the beams to oscillate. One method of avoiding this oscillation is to program controller 36 such that if a change in power in one the beams is requested, processor 36 suspends control of the other beams, thereby avoiding a competition between the beams for available power. This method, of course, restricts controlled operation of the four beams to applications in which the beams are not required to be simultaneously controlled.

Controlling beams $B_1$, $B_2$, $B_3$, and $B_4$ compensates for the above-described cross coupling, in a way that will allow the beams to be simultaneously controlled, can be accomplished by cooperatively controlling the power in laser output beam 16. The output power of an RF excited $CO_2$ laser, as exemplified here, can be conveniently controlled by pulse width modulating (PWM) at a constant repetition rate or by pulse repetition frequency (PRF) modulating the input RF power into the discharge at a constant pulse width. Processor 36 can be programmed to keep track of the total power required by all four beams and to command controller 14 via another control loop $L_5$ to raise or lower the power in output beam 16 in response to a requested change in power, in one or more of beams $B_1$, $B_2$, $B_3$, and $B_4$. This allows the beams to be controlled simultaneously.

A deficiency of the above described apparatus is that it must be located close to a workpiece to facilitate beam-delivery. FIG. 2 depicts an alternative apparatus 40 that overcomes this deficiency. Only differences between and additions to apparatus 10 are described to avoid repetition. Only sufficient detail of the beam-dividing portion of the inventive apparatus is depicted to highlight details of the modification.

In apparatus 40, beamsplitter 32 of apparatus 10 has been removed. Individual focusing lenses 32 of apparatus 10 are replaced in apparatus 40 by a single lens 42. The focal length of the lens is selected, cooperative with the optical path distance from the lens from the AO-cell 22, such that diverging beams $B_1$, $B_2$, $B_3$, and $B_4$ propagate parallel to each other. In addition, the lens focuses the beams to a beam waist position at which are arranged proximal ends 44A of optical fibers 44. The spacing of the proximal ends corresponds to the spacing of the beams such that each beam is focused into a corresponding one of the optical fibers.

It should be noted that the term "single lens" as used in this description and the appended claims means only that one lens focuses all secondary beams into the optical fibers. The lens itself, while depicted in FIG. 2 as only a single optical element, may include two or more elements for aberration correction, as is known in the art.

Hollow core optical fibers 44 are held in grooves 46 in a support platform 48. Platform 48 is preferably made from aluminum, but can be made from other metallic materials or from dielectric materials. Fibers 44 can be referred to functionally as beam-spreading or beam-separating fibers. Fibers 44 are curved such that distal ends 44B thereof are separated from each other by a distance greater than proximal ends thereof are separated from each other. The distal ends are preferably separated from each other sufficiently to allow a male fiber connector 50 to be attached to each one, leaving sufficient space that a female connector can be easily attached to each one of the male connectors, as discussed below. The hollow core is required because of the long wavelength, for example greater than about 9.0 micrometers (µm) of radiation in the beam.

Hollow-core optical fibers 52 are provided for transporting the beams from the spreading fibers to the remote location of the workpiece (not shown). Proximal end 52A of each fiber has a female connector 54 thereon for attaching the fiber to male connector 50 of the corresponding spreading fiber. Beams are delivered from distal ends 52B of fibers 52 to the workpiece. Beamsplitters 56 send samples $S_1$, $S_2$, $S_3$, and $S_4$, one for each beam, to detectors $D_1$, $D_2$, $D_3$, and $D_4$ respectively. The detectors are cooperative with monitoring circuitry 34 as described above with reference to apparatus 10 of FIG. 1.

It is particularly important in the arrangement of the present invention that beam-power be monitored after leaving the transport fibers as depicted in FIG. 2 and not at the output of AO-cell 22 as is the case in apparatus 10 of FIG. 1. A reason for this is as follows.

Unlike solid-core fibers used for transporting radiation at wavelengths from the ultraviolet (UV) through the near infrared (NIR), hollow-core fibers are particularly susceptible to losses at curves in the fibers and relatively small changes in the curvature, even changes occasioned by vibration, can cause a significant change in loss. While the spreading fibers 44 can be maintained in a fixed curvature by grooves 46 in block 48, it will usually not be practical to constrain transport fibers 52 to prevent small changes in curvature. Accordingly, as it is important that power of the beams on the workpiece is controlled, it is important that power monitoring for control purposes occurs after each beam leaves distal end 52B of the corresponding transport fiber 52.

A disadvantage of both of the above-described apparatuses is that simultaneous delivery of the beams and the use of analog circuitry sets a limit on the precision and flexibility with which beam parameters such as power and energy can be controlled. It may be useful in certain applications to provide more precise control of such parameters.

SUMMARY OF THE INVENTION

In one aspect of the present invention, laser apparatus comprises a laser providing an output beam. The output beam includes a repeated sequence of at least first and second pulses. One arrangement is provided for directing at least a portion of the output beam sequentially into at least first and second secondary beams, propagating laterally spaced apart from each other. The first secondary beam includes only repeated ones of the first pulses and the second secondary beam includes only repeated ones of the second pulses. Another arrangement is provided for monitoring the time-averaged power in each of the first and second secondary beams and comparing the monitored time-averaged power with a desired time-averaged power in each of the first and second secondary beams. A further arrangement is provided cooperative with the power monitoring and comparing arrangement for adjusting the duration of the pulses in the first and second secondary beams, such that the monitored time-averaged power in each of the secondary beams is equal to the desired time-averaged power.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 2:
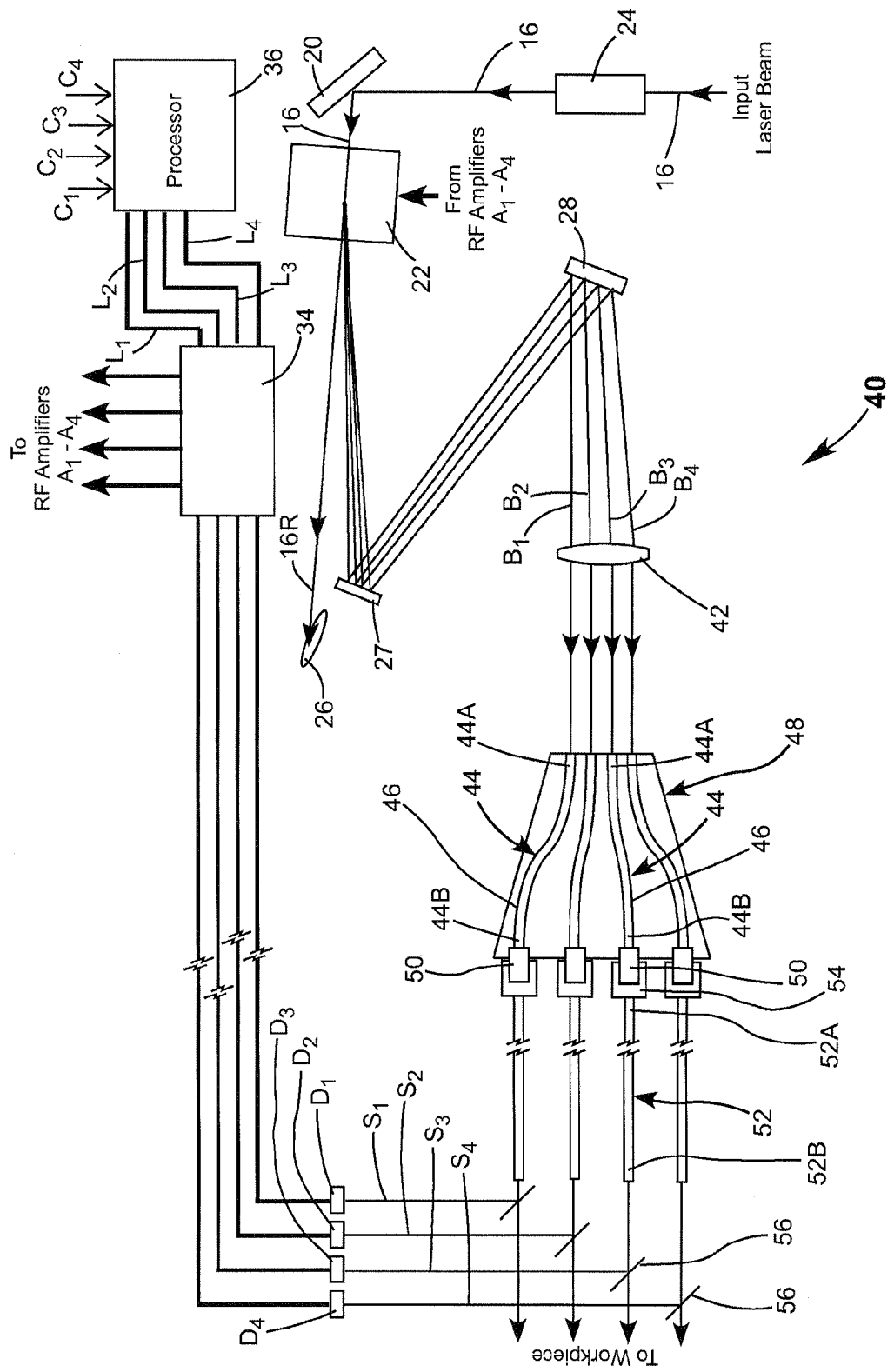
FIG. 2 schematically illustrates a prior-art modification of the apparatus of FIG. 1 for transporting the plurality of beams via a corresponding plurality of hollow-core fibers to a target location remote from the apparatus.
Figure 3:
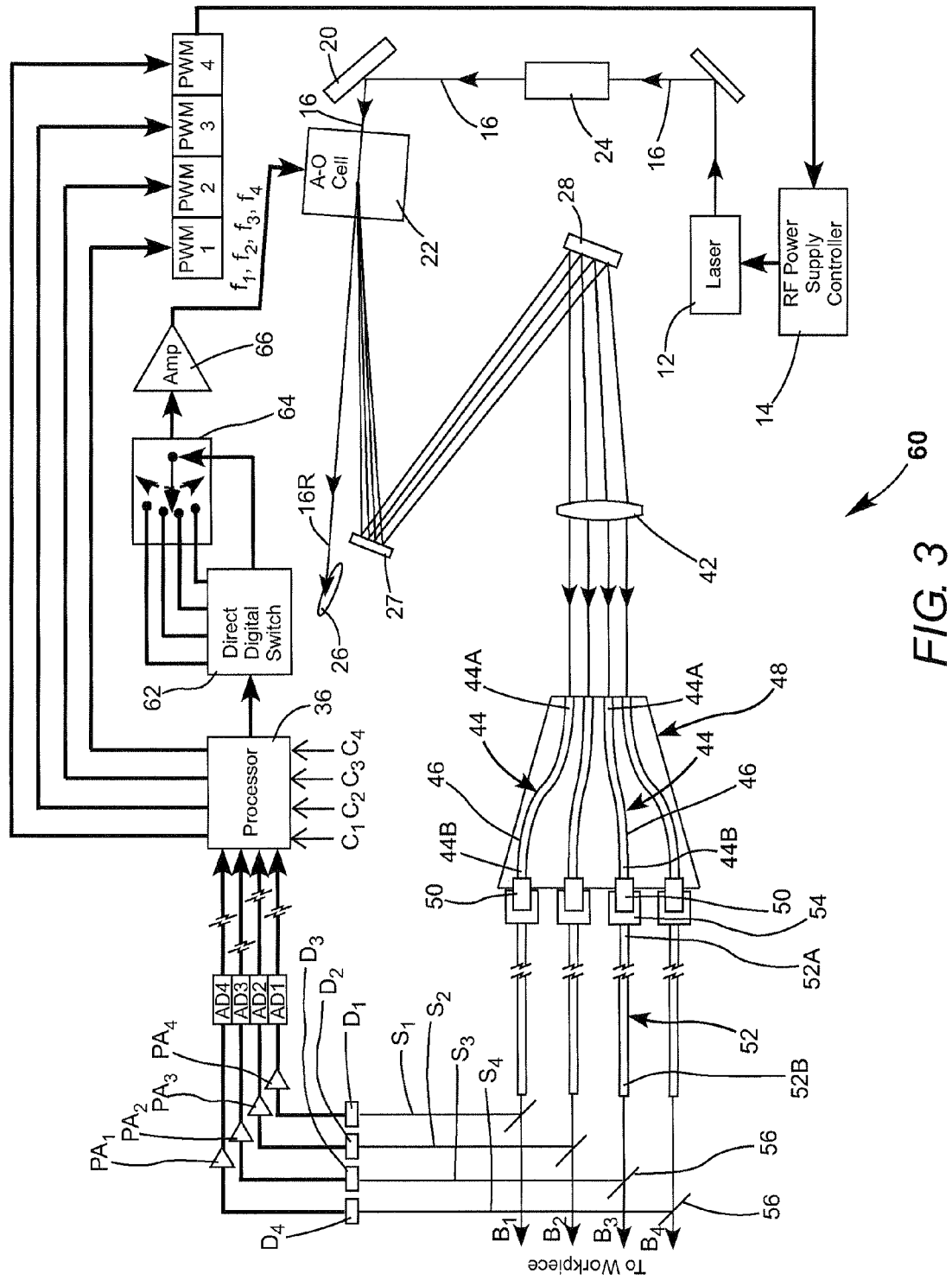
FIG. 3 schematically illustrates an embodiment of apparatus in accordance with the present invention, similar to the apparatus of FIG. 2, but wherein the beams are sequentially delivered at the target location.

Apparatus in accordance with the present invention is depicted in FIG. 3 as apparatus 60 and is described in terms of a modification of above-described beam dividing apparatus 40 of FIG. 2. Only differences between and additions to apparatus 10 are described to avoid repetition. The optical arrangement is the same as that of apparatus 40 and features thereof are designated by like reference numerals. Differences between apparatus 60 and apparatus 40 relate primarily to electronic operation of the apparatus. This is arranged such that the plurality of beams produced by the apparatus from a single laser-beam is sequentially delivered rather than simultaneously to a workpiece. A preferred mode of operation of apparatus 60 is described with additional reference to the timing diagram of FIG. 4, and is referred to herein as time division multiplexing (TDM), with pulse width modulation (PWM).

Referring now to FIG. 3, beams, $S_1$, $S_2$, $S_3$ and $S_4$ from mirrors 56 are detected by detectors $D_1$, $D_2$, $D_3$, and $D_4$, respectively. Such detectors are preferably thermopile detectors. Electrical outputs from detectors $D_1$, $D_2$, $D_3$, and $D_4$, are amplified by preamplifiers $PA_1$, $PA_2$, $PA_3$, and $PA_4$, respectively. Suitable preamplifiers are available as model AD8557 from Analog Devices Inc. of Norwood, Mass. Outputs from preamplifiers $PA_1$, $PA_2$, $PA_3$, and $PA_4$, representing measured average power in the laser beams, are fed to analog-to-digital (A/D) converters AD1, AD2, AD3, and AD4, respectively. Suitable A/D converters are available as model CS5509, from Cirrus Logic Inc of Austin, Tex. The outputs from the A/D converters are sent to processor 36. A user provides control inputs $C_1$, $C_2$, $C_3$ and $C_4$ to the processor as described above with reference to the apparatuses of FIGS. 1 and 2. These inputs tell the processor what average power is required in each of the four laser beams. The processor compares the outputs of the preamplifiers with the desired average power specified by $C_1$, $C_2$, $C_3$ and $C_4$ and calculates what changes need to be made to the pulse widths (pulse durations) of the laser beams to achieve the desired average power.

The processor communicates the required changes in pulse width along with a time sequence required for each beams to pulse width modulators $PWM_1$, $PWM_2$, $PWM_3$, and $PWM_4$. The 4 PWMs are commercially available in one microchip package. One suitable such microchip package is available as model XCR3512XL from Xilinx Inc of San Jose, Calif. The four PWM's communicate the required pulse-width signals in the required time sequence to RF power-supply controller 14. The RF power-supply controller provides the required pulse-width information in the required time sequence to discharge electrodes (not shown) of laser 12.

To provide the RF frequency pulses in the require time sequence synchronized to the laser pulse-width time sequence given to the PWMs, processor 36 provides signals to a direct digital synthesizer (DDS) 62. One suitable DDS is available as model number AD9954 from Analog Devices Inc. By way of example, one approach for delivering frequency information (for beam division) along with a required time-sequence and a required pulse-width is to provide the RF frequencies to an electronic switch 64 via separate connecting lines. One suitable electronic switch is available as model HSWA2-30DR from Minicircuit Inc, of Brooklyn, N.Y. DDS 62 also informs ES 64 when to select one of the beam-dividing frequencies $f_1$, $f_2$, $f_3$ and $f_4$ (alternatively $RF_1$, $RF_2$, $RF_3$, and $RF_4$) and how long each of the frequencies is to be turned on. The time-sequenced RF frequencies are then delivered to a power amplifier 66. The pulsed frequency signals $f_1$, $f_2$, $f_3$ and $f_4$ are then provided to AO-cell 22 in the required sequence. Since the RF pulses provided to the laser discharge determine the width of the laser pulses irradiating the work piece, it is only required that the pulse-widths of the RF pulses provided to the AO-cell be equal to or wider than the widest (longest duration) envisioned laser-pulses desired to be delivered to the work piece.

In an alternate configuration of apparatus 60, ES 64 may be omitted. This can be accomplished by having the processor also issue time-sequence and pulse-width commands for the pulsed RF frequencies generated by the DDS. In this configuration, DDS 62 provides the time-synchronized frequencies directly to power amplifier 66 via a single connecting line connecting line.

With a 32-bit phase-accumulator and a 400 MHz clock (not shown) within the DDS, it is possible to achieve approximately a 0.09 Hertz frequency reset precision. Higher bit-number phase-accumulators and higher frequency clocks can be used if higher reset precision of the RF frequencies is required. The high reset-ability of the RF frequencies provided by the above described arrangement provides accurate coupling the multiple laser beams into the apertures fibers 46. In addition the arrangement enables high resolution in setting individual pulse energies.

Figure 4:
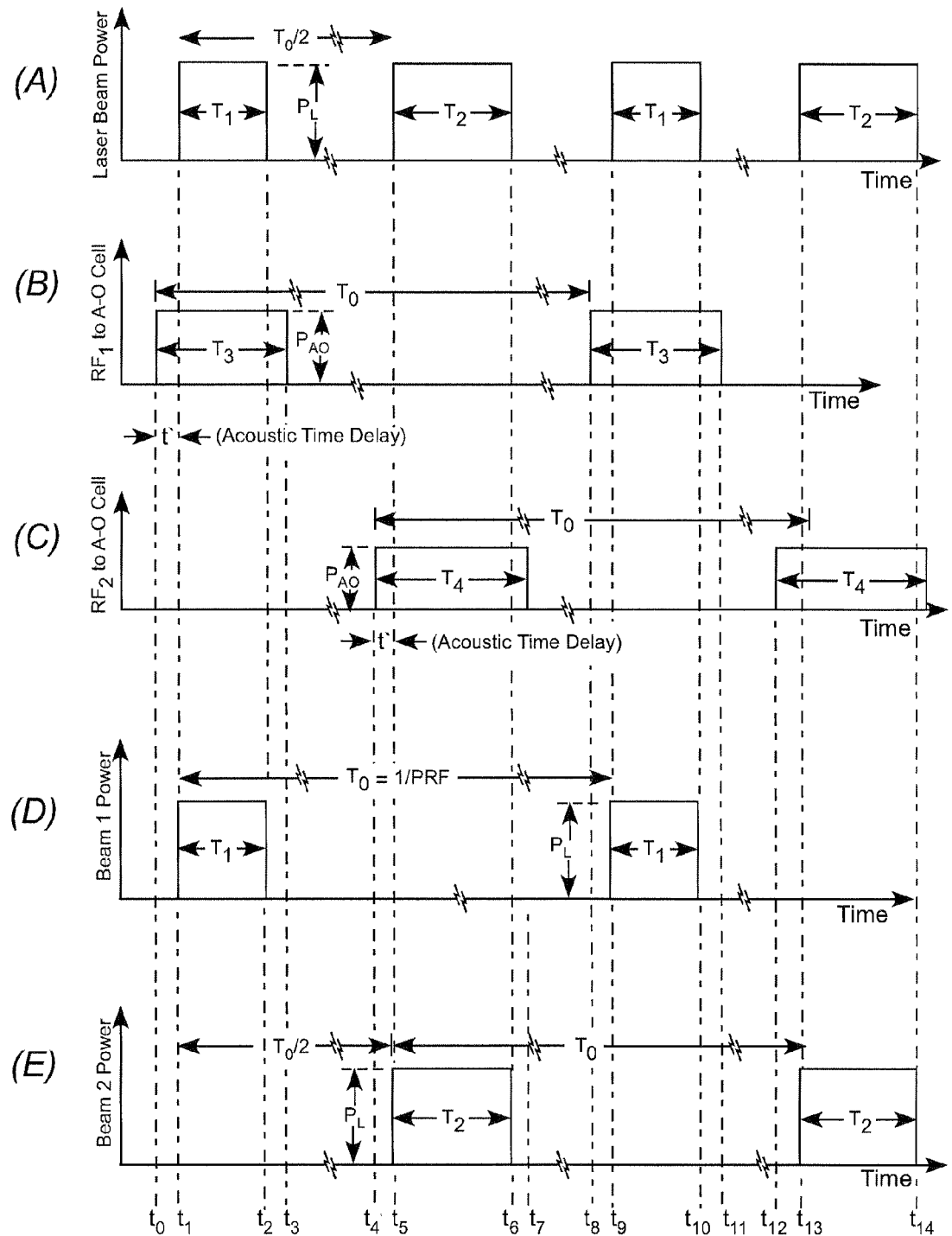
FIG. 4 is a timing diagram schematically illustrating one preferred operation scheme for the apparatus of FIG. 3.

In FIG. 4, graphs A, B, C, D, and E, constitute a timing diagram schematically illustrating an example of preferred mode of operation of apparatus 60. In this example it is assumed, for simplicity of illustration that beam 16 is divided by AO-cell 22 into only two beams. Those skilled in the art will recognize from the following description how the apparatus will be operated when the AO-cell provides three or more beams. In this scheme, beam 16 of pulses from laser 12 are divided sequentially into secondary beams with only one RF frequency being applied to the AO-cell at any instant. In the prior-art schemes the beam is simultaneously divided into the secondary beams with as many different RF frequencies being applied to the AO-cell as there are secondary beams.

Graph A schematically illustrates a portion of a pulse train in beam 16 from laser 12. The pulse train comprises pulses alternating in duration between $T_1$ and $T_2$. The pulse durations are set by the pulse width modulators of FIG. 3 according to a desired average power in each of the two beams into which beam 16 will be divided. Consecutive pulses are separated by a time $T_0/2$, which is one half of the period $T_0$ between pulses in each of the two beams. $T_0$ is equal to 1/PRF, where PRF is the pulse-repetition frequency in each of the two beams.

At time $t_0$ a first RF pulse at a frequency $RF_1$ and having a peak power $P_{AO}$ is turned on and applied to the AO-cell for a time duration of $T_3$ (see Graph B). At a delay time $t_1$, which occurs at a time t' latter than $t_0$, a first $T_1$ pulse is directed (diffracted) into the first of two beam paths by the AO-cell (see Graph D). Delay time t' is the acoustic propagation time required for an acoustic wave launched into the AO-cell to reach a point where laser beam 16 is propagating through the AO-cell to form the first of the two laser beams. In order to ensure that the entire laser pulse is diffracted by the AO-cell, $T_3$ is chosen to be equal to or longer than $T_1$, but is very much shorter than $T_0$, i.e., the period between the pulses in the train. At time $t_2$, the laser pulse is turned off by the RF Power supply to laser 12. At time t3 the RF pulse to the AO-cell is turned off. This process is repeated at time $t_8$ for the $RF_1$ acoustic pulse and at time $t_9$ for the laser output pulse with both at the same pulse-repetition frequency (PRF). The laser pulse is turned off at time $t_{10}$ and the RF pulse to the cell is turned off at time $t_{11}$.

At time $t_4$ a second RF pulse at a frequency $RF_2$ and also having a peak power $P_{AO}$ is turned on and applied to the AO-cell for a time duration of $T_4$ (see Graph C). At a delay time $t_5$, which occurs at a time t' latter than $t_4$, a first $T_2$ pulse is diffracted into the second of two beam paths by the AO-cell (see Graph E). $T_4$ is equal to or longer than $T_2$. At time $t_6$, the pulse in the laser beam is turned off. At time $t_7$ the $RF_2$ pulse to the AO-cell is turned off. This process is repeated at time $t_{12}$ for the $RF_1$ acoustic pulse and at time $t_{13}$ for the laser output pulse with both at the same pulse-repetition frequency (PRF). The laser pulse is turned off at time $t_{14}$ and the $RF_2$ pulse to the cell is turned off at time shortly thereafter as indicated in Graph C.

The amplitudes of all of the laser-pulses and the acoustic RF pulses are assumed to be the same, with only the pulse widths allowed to vary for controlling average power in each of the beams. All of the pulse trains are assumed to have the same PRF. Each pulse in the train of pulses is also assumed to be initiated $T_o/N$ later then the proceeding pulse where N equals the number of laser beams produced by the AO-cell (two beams in the example of FIG. 4).

It is emphasized, here that it is not the pulses applied to the AO-cell that control the time averaged power in the beams produced by the cell. This is done by the pulse width modulators which control the duration for the laser output pulses by pulse-width modulation of the RF power supply that pulses the laser discharge. In a simplest configuration the duration of RF pulses to the cell may simply be fixed at the longest duration contemplated in operating the apparatus. It is possible, however, to provide some active control of the duration of the RF pulses to the cell so that these pulses are not unnecessarily longer than the laser pulses, and thereby minimize power consumption and heating of the RF cell.

The energy content per pulse ($E_p$) equals the product of the laser power $P_L$ and the time duration of the pulses, namely $T_1$ or $T_2$ in this example. The average power delivered to the work piece by each of the laser beams is the energy content per pulse ($E_p$) divided by the period ($T_o$) of each of the pulse trains.

Figure 1:
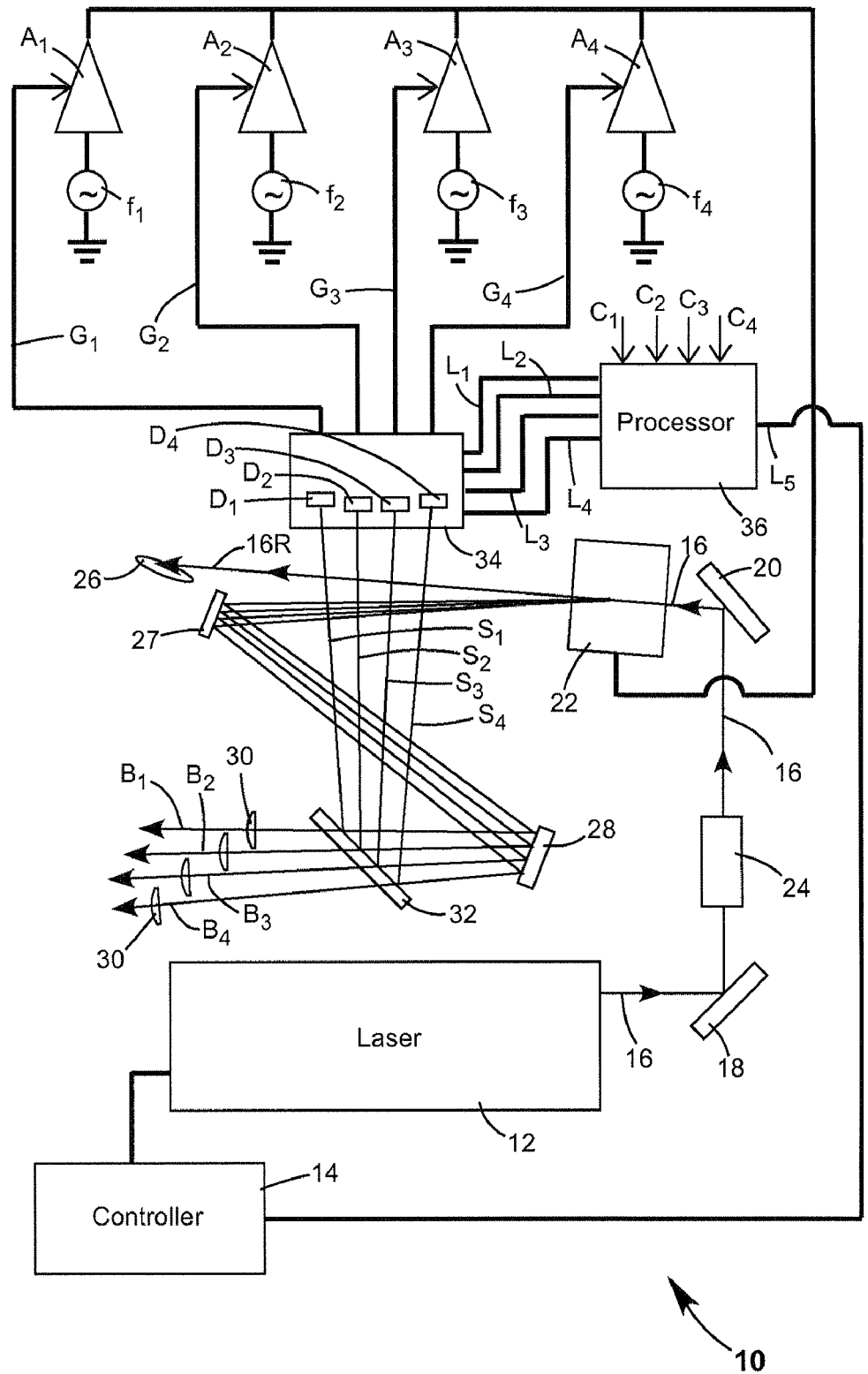
FIG. 1 schematically illustrates a prior-art apparatus for dividing a beam from a $CO_2$ laser into a plurality of beams simultaneously delivered at a target location proximate the apparatus, but wherein the power in each beam is separately controllable.

A major advantage of the pulse width modulation (PWM) scheme of the present invention compared with the analog amplitude modulation scheme of the prior-art apparatuses of FIGS. 1 and 2, is that the PWM scheme provides a higher resolution in controlling the average laser power delivered to the work piece by each of the laser beams. By way of example, if a typical 25.0 megahertz (MHz) clock, commonly used in digital circuitry, is used in processor 36 of apparatus 60, the pulse widths can be controlled with a time resolution equal to the period of the clock frequency, i.e., 40.0 nanoseconds (ns) in the case of a 25 MHz. If the period $T_o$ of each of the pulsed trains of the laser beams of FIG. 4 is 0.01 seconds, this corresponds to a resolution of one part in 250,000.

The present invention is described above in terms of a preferred embodiment. The invention, however, is not limited to the embodiment described and depicted herein. Rather the invention is limited only to the claims appended hereto.

What is claimed is:

1. Apparatus comprising:
    a laser providing an output beam, the output beam including a repeated sequence of at least first and second pulses;
    an arrangement for directing at least a portion of said output beam sequentially into at least first and second secondary beams, propagating laterally spaced apart from each other, with the first secondary beam including only repeated ones of the first pulses and the second secondary beam including only repeated ones of the second pulses;
    an arrangement for monitoring the time-averaged power in each of the first and second secondary beams and comparing the monitored time-averaged power with a desired time-averaged power in each of the first and second secondary beams; and
    an arrangement cooperative with the power monitoring and comparing arrangement for adjusting the duration of the pulses in the first and second secondary beams, such that the monitored time-averaged power in each of the secondary beams is equal to the desired time-averaged power.

2. The apparatus of claim 1 further including at least first and second receiving optical fibers, each thereof having a distal end and a proximal end;
    a supporting arrangement for the first and second receiving optical fibers, the first and second receiving optical fibers being constrained, laterally spaced apart, on the supporting arrangement with the distal ends of the optical fibers being spaced apart by a distance greater than the distance by which the proximal ends are spaced apart; and
    a single lens arranged to focus the first and second secondary beams into the proximal ends of respectively the first and second receiving optical fibers.

3. The apparatus of claim 2, further including first and second transporting optical fibers, with proximal ends of said transporting optical fibers being connected to the distal ends of said receiving optical fibers for transporting said secondary beams to a location remote from said laser.

4. The apparatus of claim 3, wherein the tine-averaged power monitoring arrangement includes first and second detectors arranged to sample respectively the first and second secondary beams exiting distal ends of respectively the first and second transport optical fibers.

5. The apparatus of claim 1, wherein the beam directing arrangement includes an acousto-optic (AO) cell in a path of the beam from the laser and the sequential directing of the beam into the first and second secondary beams is effected by repeatedly sequentially applying respectively first and second RF frequencies to the AO-cell, the first RF frequency being different from the second RF frequency.

6. Apparatus comprising:
    a laser providing an output beam, the output beam including a repeated sequence of at least first and second pulses;
    an acousto-optic cell arranged for directing at least a portion of said output beam sequentially into at least first and second secondary beams, propagating laterally spaced apart from each other, with the first secondary beam including only repeated ones of the first pulses and the second secondary beam including only repeated ones of the second pulses, and the beam-division being effected by sequentially applying first and second RF frequencies to the cell, the first and second frequencies being different;

an arrangement for monitoring the time-averaged power in each of the first and second secondary beams and comparing the monitored time-averaged power with a desired time-averaged power in each of the first and second secondary beams; and an arrangement cooperative with the power monitoring and comparing arrangement for adjusting the duration of the pulses in the first and second secondary beams, such that the monitored time-averaged power in each of the secondary beams is equal to the desired time-averaged power, the adjustment of the pulse-durations in the first and second secondary beams being effected by varying the duration of corresponding pulses in the primary beam.

7. The apparatus of claim 6, wherein the first and second RF frequencies are applied to the acousto-optic cell for a duration about equal to or greater than respectively the duration of the first and second pulses in the sequences thereof.

8. The apparatus of claim 7, further including at least first and second receiving optical fibers, each thereof having a distal end and a proximal end;

a supporting arrangement for the first and second receiving optical fibers, the first and second receiving optical fibers being constrained, laterally spaced apart, on the supporting arrangement with the distal ends of the optical fibers being spaced apart by a distance greater than the distance by which the proximal ends are spaced apart; and a single lens arranged to focus the first and second secondary beams into the proximal ends of respectively the first and second receiving optical fibers.

9. The apparatus of claim 8, further including first and second transporting optical fibers, with proximal ends of said transporting optical fibers being connected to the distal ends of said receiving optical fibers for transporting said secondary beams to a location remote from said laser.

10. The apparatus of claim 9, wherein the tine-averaged power monitoring arrangement includes first and second detectors arranged to sample respectively the first and second secondary beams exiting distal ends of respectively the first and second transport optical fibers.

11. A laser system comprising:
a laser for generating a pulsed radiation beam;
an acousto-optic cell through which the radiation beam is directed;
a driver for supplying pulses of RF energy to the cell for selectively diffracting individual pulses along one of a plurality of possible paths depending upon the frequency of the RF energy supplied to the cell;
a detector system for monitoring the time averaged power in each of the beam paths and generating feedback signals; and
a controller responsive to the feedback signals for controlling the length of individual pulses generated by the laser, said controller cooperating with the driver to control the time averaged power of the beam along said possible beam paths.

12. A laser system as recited in claim 11 wherein said possible beam paths are laterally spaced apart.

13. A laser system as recited in claim 12 wherein driver operates to sequentially diffract individual pulses along different possible paths so that a first pulse in a sequence is directed along a first path and subsequent pulses in the sequence are each directed along a different path until the sequence is finished and thereafter the sequence is repeated.

14. A method of delivering pulses of laser light along a plurality of laterally spaced beam paths comprising the steps of:
generating a sequence of laser pulses;
directing the pulses through an acousto-optic cell;
supplying the cell with pulses of RF energy for selectively diffracting individual pulses along one of said paths, the selected path depending upon the frequency of the RF energy supplied to the cell;
monitoring the time averaged power in each of the beam paths and generating feedback signals; and
adjusting the length of individual lasers pulses in response to the feedback signals to achieve a predetermined time averaged power along each selected beam path.

15. A method as recited in claim 14 wherein the laser pulses are sequentially diffracted along different possible paths so that a first pulse in a sequence is directed along a first path and subsequent pulses in the sequence are each directed along a different path until the sequence is finished and thereafter the sequence is repeated.

* * * * *